| (12) | United States Patent | (10) Patent No.: | US 10,808,898 B2 |
|---|---|---|---|
| | Hernandez, IV | (45) Date of Patent: | Oct. 20, 2020 |

(54) SOLAR POWERED LIGHT ASSEMBLY WITH SENSOR

(71) Applicant: Tiger Tech Industries, Holland, MI (US)

(72) Inventor: Luciano Hernandez, IV, Holland, MI (US)

(73) Assignee: Tiger Tech Industries, Holland, MI (US)

( * ) Notice: Subject to any disclaimer, the term of this patent is extended or adjusted under 35 U.S.C. 154(b) by 20 days.

(21) Appl. No.: 15/082,344

(22) Filed: Mar. 28, 2016

(65) Prior Publication Data

US 2016/0281942 A1 Sep. 29, 2016

Related U.S. Application Data

(60) Provisional application No. 62/138,672, filed on Mar. 26, 2015.

(51) Int. Cl.
*F21V 23/04* (2006.01)
*F21S 9/03* (2006.01)
*H02S 40/38* (2014.01)
*F21V 31/00* (2006.01)
*B60Q 1/26* (2006.01)
*F21V 21/08* (2006.01)
(Continued)

(52) U.S. Cl.
CPC .............. *F21S 9/037* (2013.01); *H02S 40/38* (2014.12); *B60Q 1/2611* (2013.01); *B60Q 1/2615* (2013.01); *B60Q 1/50* (2013.01); *F21V 21/0808* (2013.01); *F21V 23/0464* (2013.01); *F21V 23/0471* (2013.01); *F21V 31/00* (2013.01); *F21V 33/008* (2013.01); *F21W 2107/10* (2018.01); *F21Y 2115/10* (2016.08)

(58) Field of Classification Search
CPC .... B60Q 3/025; B60Q 3/0253; B60Q 3/0279; B60Q 1/2611; B60Q 1/24; B60Q 1/245; F21V 21/0808; F21V 21/096; F21V 21/0965; F21V 23/003; F21V 23/004; F21V 23/005; F21V 23/0442; F21V 23/0464; F21V 23/0492; F21S 9/037; F21S 41/141
USPC .......................................... 362/520, 479, 493
See application file for complete search history.

(56) References Cited

U.S. PATENT DOCUMENTS

| 4,152,940 A * | 5/1979 | Saito | .................. G01V 1/16 73/653 |
|---|---|---|---|
| 4,185,503 A * | 1/1980 | Saito | .................. G01H 9/00 250/231.1 |

(Continued)

*Primary Examiner* — Ismael Negron
(74) *Attorney, Agent, or Firm* — The Watson IP Group, PLC; Jovan N. Jovanovic

(57) ABSTRACT

A light attachable to an outside surface includes a base, a housing and an electronic assembly. The housing has an outer surface, an inner surface and a mating surface. The two are joined to define a substantially fluid tight cavity. The housing has a lens portion and a charging portion; each are at least one of transparent and translucent. The electronic assembly is positioned within the housing, and includes at least one LED light, control circuitry coupled to the LED light, a solar panel and a battery coupled to the control circuitry. The solar panel is configured to charge the battery. The battery is coupled to the LED light under the control of the control circuitry. A plurality of sensors provide data to the control circuitry to direct the LED light in one of an on position and an off position.

10 Claims, 6 Drawing Sheets

(51) Int. Cl.
*F21W 107/10* (2018.01)
*F21Y 115/10* (2016.01)
*F21V 33/00* (2006.01)
*B60Q 1/50* (2006.01)

(56) References Cited

U.S. PATENT DOCUMENTS

| | | | | |
|---|---|---|---|---|
| 4,768,381 A * | 9/1988 | Sugimoto | G01H 9/00 | 356/486 |
| 5,090,031 A * | 2/1992 | Pyne | G06M 7/04 | 198/392 |
| 5,495,767 A * | 3/1996 | Wang | G01H 9/00 | 356/498 |
| 5,641,904 A * | 6/1997 | Kopp | G01M 1/22 | 73/457 |
| 5,652,390 A * | 7/1997 | Melkoumian | G01D 5/344 | 356/477 |
| 5,782,552 A * | 7/1998 | Green | F21S 9/037 | 362/183 |
| 6,013,985 A * | 1/2000 | Green | F21S 9/037 | 315/149 |
| 6,175,196 B1 * | 1/2001 | Ragner | B60Q 1/326 | 315/149 |
| 6,402,338 B1 * | 6/2002 | Mitzel | A47G 29/1212 | 362/154 |
| 6,470,753 B2 * | 10/2002 | Maruyama | G01H 9/00 | 73/657 |
| 7,045,975 B2 * | 5/2006 | Evans | F21S 8/035 | 315/149 |
| 7,137,723 B2 * | 11/2006 | Hwan | B60Q 1/2684 | 362/503 |
| 7,196,780 B2 * | 3/2007 | Wada | G01P 3/366 | 356/28.5 |
| 7,505,033 B2 * | 3/2009 | Guo | G06F 3/0317 | 345/156 |
| 7,588,349 B2 * | 9/2009 | Yen | F21S 9/037 | 315/149 |
| 8,348,453 B2 * | 1/2013 | Cumberland | F21S 8/036 | 362/192 |
| 8,508,348 B2 * | 8/2013 | Suzuki | B60K 1/04 | 340/425.5 |
| 8,833,985 B2 * | 9/2014 | Robertson | F21L 4/08 | 362/431 |
| 8,845,125 B1 * | 9/2014 | Lumsden | E01F 13/06 | 340/908 |
| 8,907,202 B1 * | 12/2014 | Brusaw | H01L 31/0488 | 136/244 |
| 9,157,591 B2 * | 10/2015 | Rozot | F21S 2/005 | |
| 9,248,778 B2 * | 2/2016 | Ford | B60Q 1/2611 | |
| 2006/0012996 A1 * | 1/2006 | Tseng | F21S 9/037 | 362/253 |
| 2006/0102225 A1 * | 5/2006 | Chou | F21S 9/037 | 136/244 |
| 2007/0121335 A1 * | 5/2007 | Fujimoto | B62J 6/01 | 362/475 |
| 2009/0190367 A1 * | 7/2009 | Chu | B60Q 1/2615 | 362/487 |
| 2010/0066672 A1 * | 3/2010 | Schoolcraft | G06F 1/1626 | 345/158 |
| 2010/0308794 A1 * | 12/2010 | Townsend | G01B 7/16 | 324/103 P |
| 2012/0112635 A1 * | 5/2012 | Cho | B62J 6/04 | 315/79 |
| 2012/0182725 A1 * | 7/2012 | King | F21S 9/037 | 362/183 |
| 2018/0111654 A1 * | 4/2018 | Emerson | B62J 6/005 | |

* cited by examiner

SOLAR POWERED LIGHT ASSEMBLY WITH SENSOR

CROSS-REFERENCE TO RELATED APPLICATION

This application claims priority from U.S. Provisional Patent Application Ser. No. 62/138,672 filed Mar. 26, 2015, entitled "Light Assembly For A Vehicle," the entire disclosure of which is hereby incorporated by reference in its entirety.

BACKGROUND OF THE DISCLOSURE

1. Field of the Disclosure

The disclosure relates in general to lights, and more particularly, to a light that is attachable to an outside surface, which can be recharged through solar power, and which can, through sensors determine whether to be on or off, that is, whether or not to power LED lights that are maintained therewithin. Among other outside surfaces, the light is particularly useful for attachment to vehicles, such as cars, trucks, tractors, loaders, lawnmowers, motorcycles, trailers, off road vehicles, watercraft, and others.

2. Background Art

The use of lights, lamps and the like on vehicles is known in the art. Typically, such lights are powered by the vehicle battery, and can be placed on different places on the vehicle. Problematically, it is often difficult to provide the necessary wiring (especially on a retrofit or the like) and to properly power the light. In addition, it is often difficult to provide the necessary switches and the like to control the light, both from a wiring perspective, and from a switch placement perspective. Often, it is just too difficult to install such lights. In other configurations, the lights may include on/off switches thereon, and the user may forget to turn off or on the lights because they are not readily accessible when the user is operating the vehicle. In other instances, one may forget to turn off such lights, which eventually drains the battery of the vehicle (especially where the vehicle is not accesses or utilized often).

SUMMARY OF THE DISCLOSURE

The disclosure is directed to a light attachable to an outside surface. The light includes a base, a housing and an electronic assembly. The base includes a lower surface and an upper surface opposite the lower surface. The upper surface and the lower surface cooperate to define an outer perimeter. The housing has an outer surface and an inner surface and a mating surface at an outer perimeter thereof. The mating surface is configured to interface with the outer perimeter of the base to define a substantially fluid tight cavity. The housing has a lens portion and a charging portion. The lens portion and the charging portion each are at least one of transparent and translucent. The electronic assembly is positioned within the housing, and includes at least one LED light, control circuitry coupled to the LED light, a solar panel coupled to the control circuitry, a battery coupled to the control circuitry. The solar panel is configured to charge the battery. The battery is coupled to the LED light selectively, under the control of the control circuitry. A plurality of sensors are positioned within the housing. The plurality of sensors provide data to the control circuitry to direct the LED light in one of an on position and an off position.

In some configurations, the at least one LED light comprises a plurality of LED lights coupled to the control circuitry.

In some configurations, the plurality of LED lights comprises between 2 and 5 LED lights.

In some configurations, the plurality of sensors comprise a movement sensor, such as a vibrometer, and a light sensor. The control circuitry directs the at least one LED light into an on position upon receiving data from the movement sensor that movement is detected, and the light sensor provides data corresponding to one of low ambient light or no ambient light.

In some configurations, the LED light is directed through the lens portion of the housing. Additionally, the solar panel is positioned so as to be visible through the charging portion of the housing.

In some configurations, the charging portion faces in an upward direction, with the lens portion facing in a an at least partially horizontal configuration.

In some configurations, the base includes an upper surface with a raised portion. The electronic assembly is mounted on the raised portion. The raised portion is configured so that once the electronic assembly is mounted thereupon, the at least one LED light is positioned to be directed through the lens portion, and the solar panel is configured to be visible through the charging portion.

In some configurations, the base further includes an outer planar portion extending inwardly from the outer perimeter. The outer planar portion is configured to receive an adhesive pad for attachment to an outer surface.

In some configurations, the light is configured for placement on a vehicle roof.

In another aspect of the disclosure, the disclosure is directed to a method of lighting. The method comprises the steps of positioning a light on an outer surface; adhering the light to the outer surface; sensing movement by one of the plurality of sensors, wherein the plurality of sensors includes a movement or vibrometer; sensing one of a low level of light and no level of light by one of the plurality of sensors; triggering the control circuitry to direct the LED light into the on position.

In some configurations, the method further includes the steps of: receiving ambient light onto a solar panel; generating electrical current; and charging a battery positioned within the housing of the light.

BRIEF DESCRIPTION OF THE DRAWINGS

The disclosure will now be described with reference to the drawings wherein.

DETAILED DESCRIPTION OF THE DISCLOSURE

Figure 1:
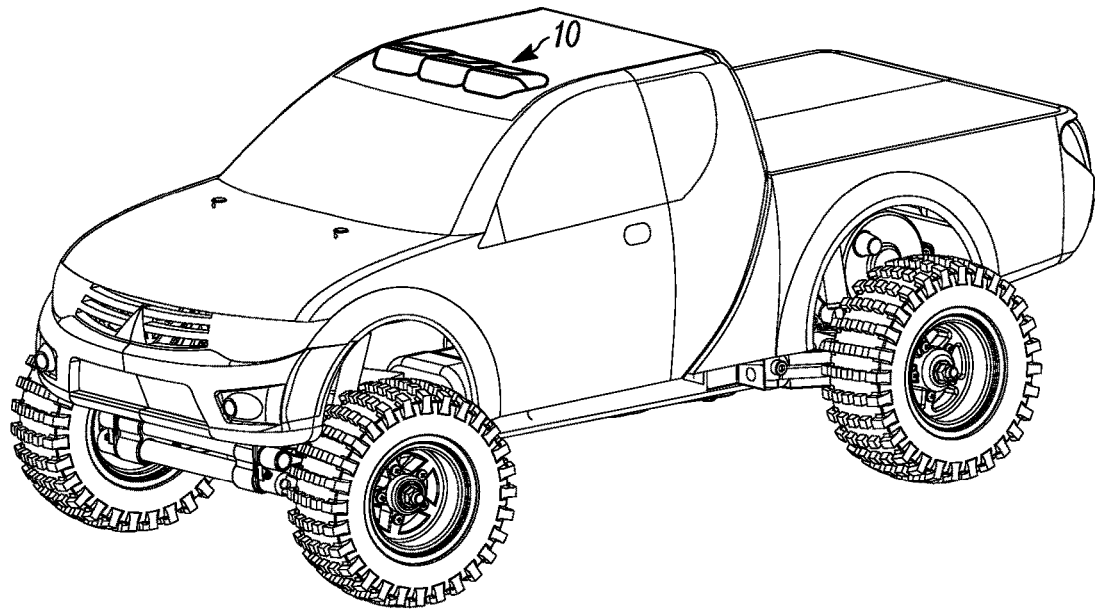
FIG. 1 of the drawings is a partial perspective view of a plurality of lights of the present disclosure on a vehicle.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the light is shown generally at 10. The light is configured for use in a number of different configurations, for example, the light may be utilized, and the initial embodiment shown is directed to, a roof light that can be placed on a vehicle, such as a truck. In other configurations, such as those shown in FIGS. 5a through 5e, the light may comprise a universal light which could be used in a number of different environments, such as a personal watercraft, a kayak, a paddleboard, a trailer, among others. In additional, other lights are contemplated as well, such as automobile or other vehicle badges, marine navigations lights, side marker lights, center cab lights and the like.

Figure 2:
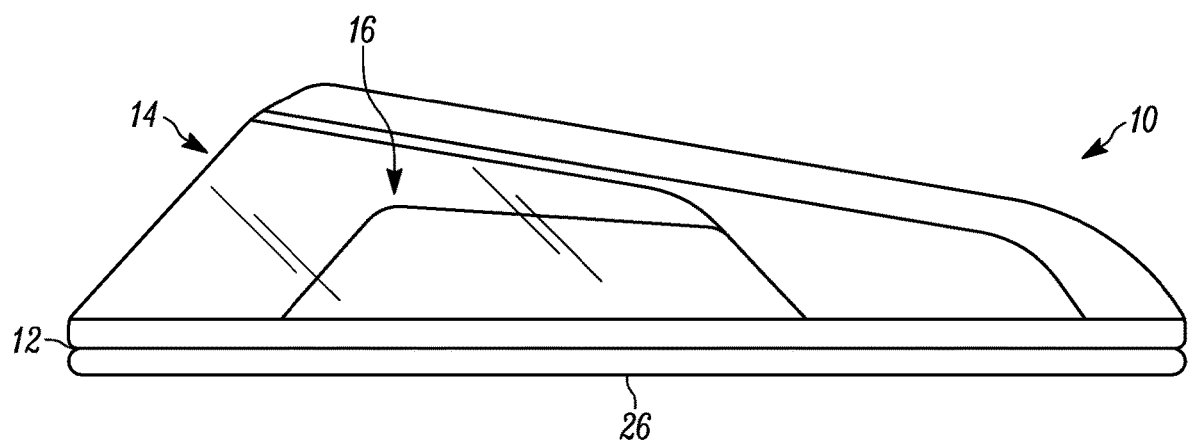
FIG. 2 of the drawings is a side elevational view of a light of the present disclosure.
Figure 3:
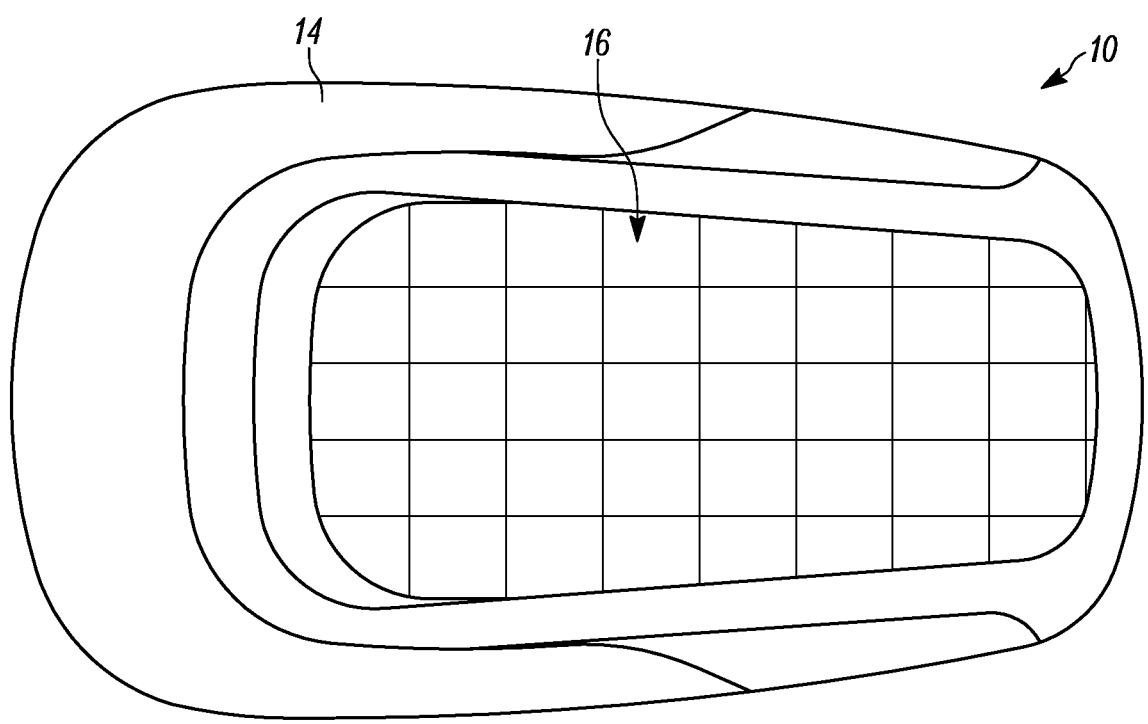
FIG. 3 of the drawings is a top plan view of a light of the present disclosure.
Figure 4:
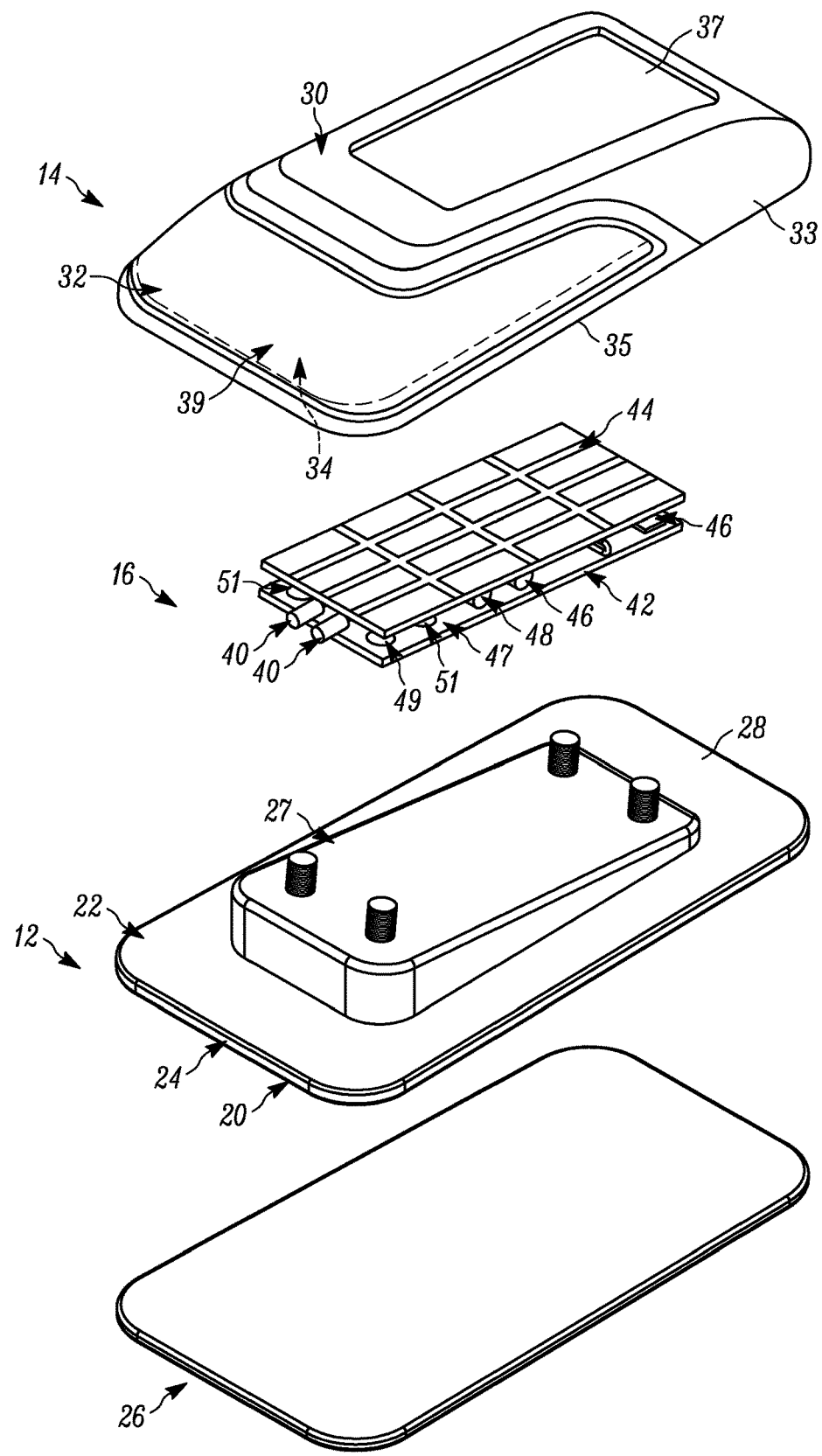
FIG. 4 of the drawings is an exploded view of a light of the present disclosure.
Figure 5A:
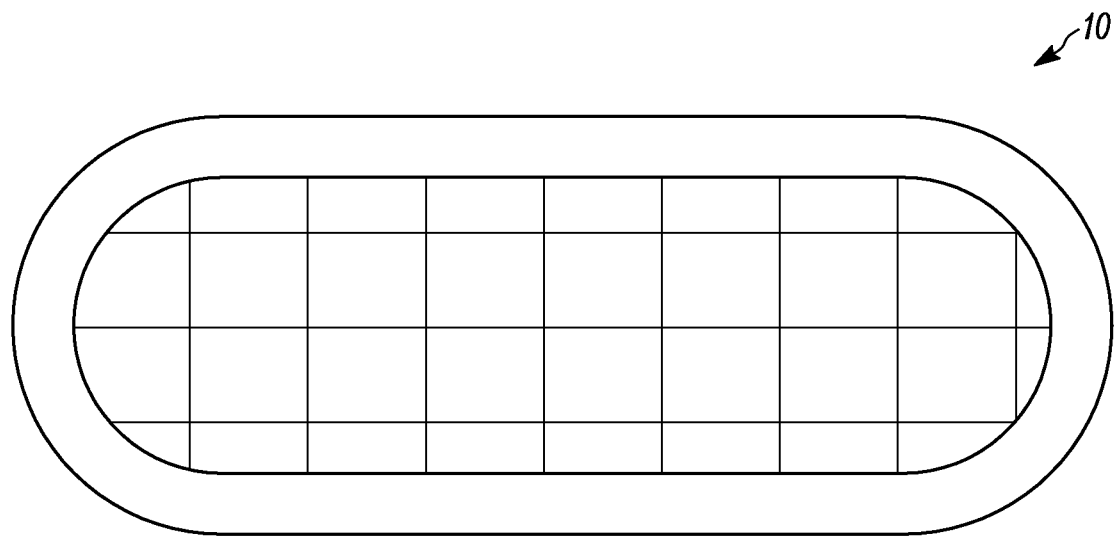
FIGS. 5a through 5e comprise various different configurations of the light of the present disclosure.
Figure 5B:
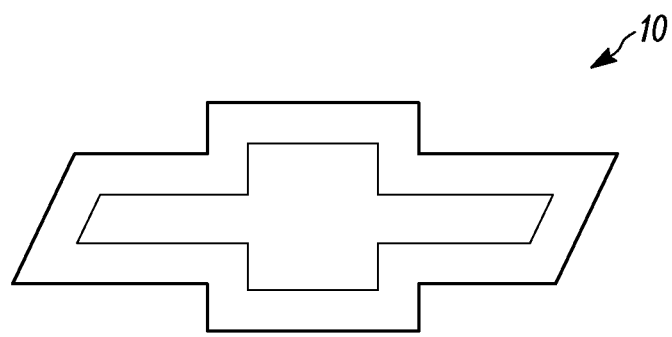
Figure 5C:
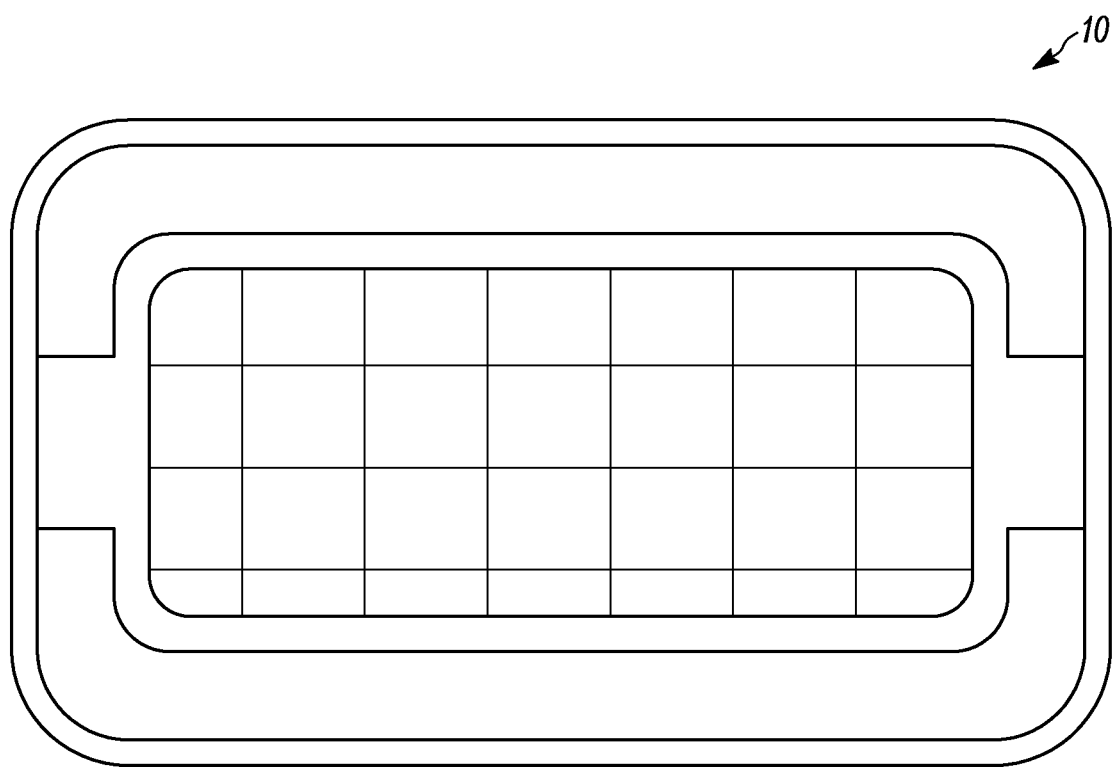
Figure 5D:
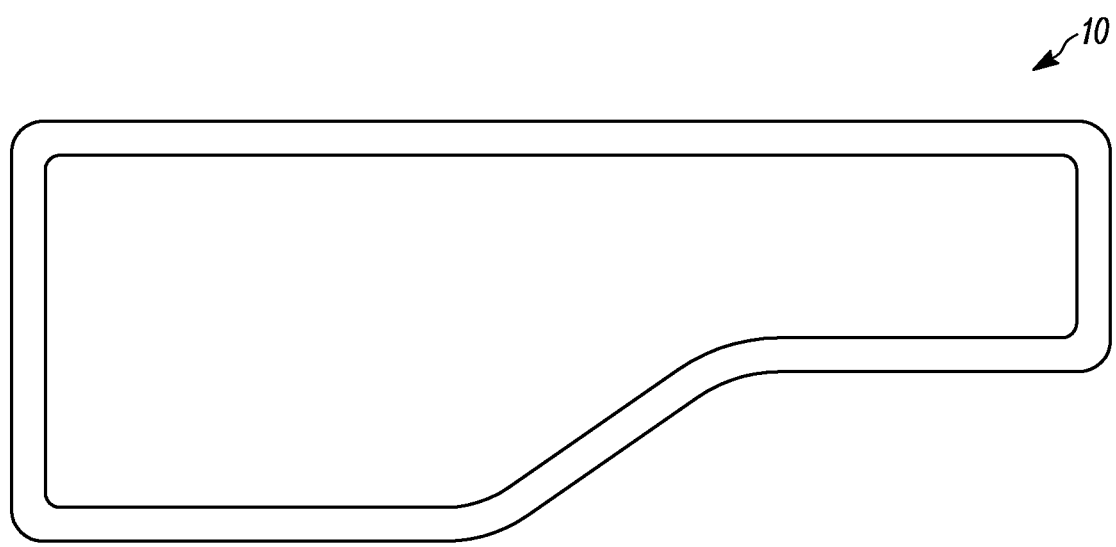
Figure 5E:
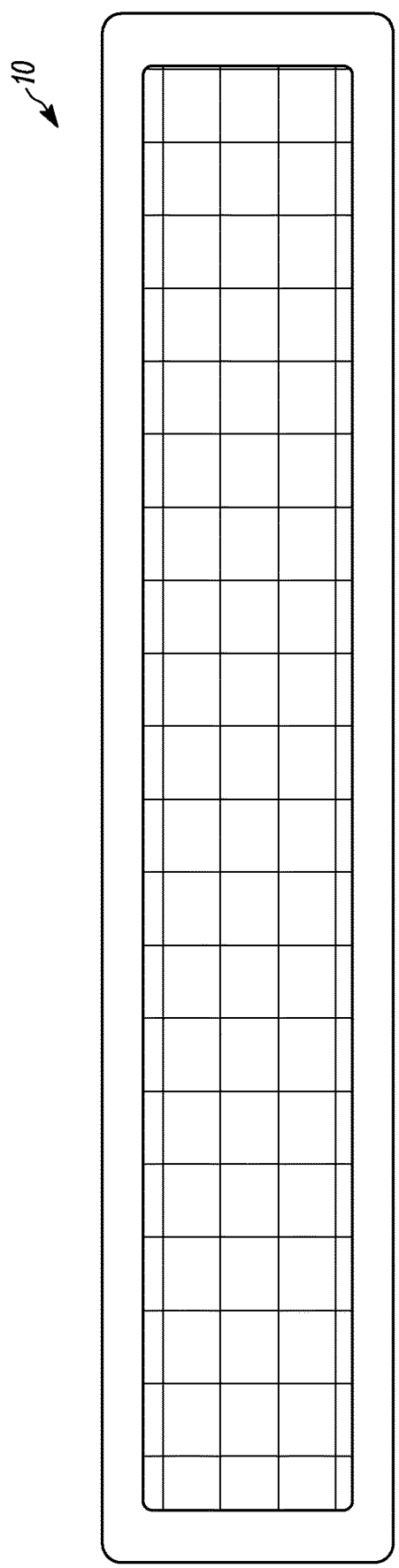

With reference to FIG. 2 through 4, The light 10 in the configurations shown, comprises a base 12, housing 14 and electronic assembly 16. The base 12 includes lower surface 20, upper surface 22 which define outer perimeter 24. In the configuration shown, the base includes a raised portion 27 that is inclined surrounded by a substantially planar portion 28. In the configuration shown, and as will be explained, the electronic assembly is mounted to the raised portion, which places the LED lights and the solar panels in the proper orientation when in the operable position. In other configurations, the base may have different characteristics or different features so as to position the electronic assembly in a different configuration. Some of the base configurations may be substantially planar, or may include various topographies. In the configuration shown, the base comprises a molded polymer based material, although other materials, such as metals and composites are likewise contemplated. Indeed, there is no limitation on the different materials that can be utilized.

The outer perimeter, in the configuration shown comprises a substantially uniform outer edge that is generally along a single plane. The shape of the outer perimeter is somewhat teardrop-like and rounded. Of course, other configurations are contemplated. The lower surface 20 generally includes a portion which defines a plane. An adhesive pad, such as adhesive pad 26 may be attached to the bottom surface and to an outside surface (such as the roof of a truck or the like). The adhesive pad may comprise a flexible member which is configured to follow the contours of the outside surface and the bottom surface, and is capable of filling gaps therebetween. In other configurations, a liquid adhesive or other type of adhesive may be utilized. In still other configurations, magnets or the like may be utilized.

The housing 14 is shown as including cover portion 30, lens portion 32, outer surface 33, inner surface 34 and mating surface 35. In the configuration shown, the cover portion 30 comprises a single material, whereas in other configurations, it may comprise multiple different members that are adhered, coupled, affixed or otherwise joined together. The lens portion 32 corresponds to the portion through which it is desirable for light to emanate. Typically, the lens portion will include a transparent or translucent portion. A reflective portion may be formed so as to extend behind the LED lights, or, a reflective portion may be formed in the base, or may comprise a component separate to each of the base and the housing. In the configuration shown, the lens portion wraps around the front and a portion of the sides of the housing. The lens portion faces at least partially horizontally, preferably, although variations are contemplated.

The cover portion extends about the remainder of the housing, and includes a transparent or translucent charging portion 37 which is configured to generally face in a direction which can be optimized for direct view of the sun or other lights from which the solar cells may generate electrical energy. In the configuration shown, the remainder of the cover portion is substantially opaque. Of course, a number of different configurations are contemplated, and as will be understood the shape, color and transparent/translucent/opaque configurations can be altered depending on the particular use and application. Preferably, the charging portion is generally directed in an upward direction to generally maximize the exposure of the solar panels to ambient light from the sun or lights that are positioned thereabove.

The inner surface 34 comprises a generally concave surface, with the outer surface 33 being substantially convex. The inner surface defines a cavity 39 with an outer mating surface 35 which generally matches or corresponds to the outer perimeter 24 of the base, so that the two components can be joined there around in a generally sealed (and preferably water proof) configuration. In the configuration shown, as the outer planar portion 28 of the base is substantially planar, the mating surface 35 is likewise substantially planar. In other configurations, the two may have various surface configurations. In addition, a third spacer member or the like may be incorporated, if desired.

It will be understood that in other configurations, the outer surface may have a configuration that mimics a logo or badge from a vehicle, with a lens portion that may extend outwardly, or which may extend entirely around the perimeter of the light. In other configurations, multiple lenses or multiple transparent/translucent portions separated by opaque portions are contemplated.

The electronic assembly 16 is shown as comprising LED lights 40, control circuitry 42, solar panels 44, battery 46, and sensors 47, which may include movement sensor 48, light sensor 49 and control sensor 51. In the configuration shown, electronic assembly 16 is configured to include the control circuitry and the solar panel spaced apart from each other and substantially parallel to each other, with the LED lights extending outwardly therefrom between the control circuitry and the solar panel. While a plurality of LED lights are shown, it will be understood that a single LED light may be provided.

The solar panels are configured to charge the battery, so that the power to the LED lights can be maintained whether or not the solar panels are generating power (or generating sufficient power). The control circuitry includes integrated circuits and/or processors which can control the timing (on-off) of the lights. One of skill in the art of circuit design having the disclosure before them would be able to configure such a control circuitry.

The sensors 47 include sensors that are configured to sense a number of different conditions. Based on these conditions, the system can either turn off or turn on the LED lights. For example, the sensor 47 may include a movement sensor, or vibrometer. The vibrometer can sense movement (such as movement of a vehicle, or the fact that the vehicle is on). The sensor can then be used to control whether the light is on or off. In the same manner, the sensor 47 may further include a light sensor that can sense ambient light conditions. In that manner, the light sensor can facilitate providing condition information to guide the control system to turning on or off the light. In one example, the control system can be configured to turn on the LED lights in the event that the vibrometer senses movement and the light sensor senses that it is dark (or that the ambient light is sufficiently low). The lights can be turned off if either one of the conditions are not met. In other configurations, an additional manually operated On/off switch may be provided. In still other configurations, a Bluetooth or other one or two way communication system may be utilized. In such a configuration, a smartphone or the like may be configured with software that can communicate with the control circuitry. The communication can set different parameters for the operation of the control circuitry and different operation for the LED lights. For example, they can be programmed to operate on particular cycles, that is, off or on based on the vibrometer data coupled with the location data from the smartphone, the time data from the smartphone, so that sunrise/sunset can be determined, if that data is not directly available. It is also contemplated that the sensors may include GPS sensors which may cooperate with the other sensors to determine as to whether to turn on or off the system. The GPS sensors may also interface with the smartphone described herein.

In operation, the user first receives the light. The light 10 may be provided in a pack of lights. In the configuration wherein the light is configured for the roof of a vehicle, a total of between 3 and 7 lights may be provided in a pack. Once received, the user can determine where on the roof of the vehicle to position the lights. Once determined, the user can prepare the adhesive for attachment to the roof of the vehicle. In particular, generally, the adhesive may have a release sheet positioned thereover, which can be removed to expose the adhesive.

With the adhesive exposed, the user can position the light and adhere it to the vehicle. Once all of the lights are adhered to the vehicle, the user can either toggle the lights off and on with a control sensor 51. In some configurations, no such control sensor is provided, and instead, the lights are triggered to turn off and on with the cooperative direction of the movement sensor (vibrometer) and the light sensor. That is, when the vibrometer senses movement (which may be solely from the vehicle being on, or where it is actually moving in a direction), and the light sensor senses low or no light, the control circuitry can direct the LED lights into the on position. Conversely, if either condition is not met, then the LED lights will either turn off, or remain off.

Advantageously, the battery within the light is a secondary battery, in that it is rechargeable. The battery may comprise a NiCAD, NIMH, Li-ion battery among other rechargeable battery solutions. The battery can be directly or indirectly recharged through the solar panels. That is, when the solar panels are exposed to sufficient light to generate electrical power, the electrical power is directed to the battery to recharge the same. Advantageously, the solar panel, in the embodiment shown is exposed almost directly upwardly so as to maximize the amount of light to which the solar panels can be exposed. In other configurations, the solar panels may face in another direction (due to the surface upon which they are positioned, or the relative orientation thereof on an outside surface), and it may take more time for the battery to be charged by the solar panels. Preferably, the battery is configured to allow for extended (6-20 hour) powering of the LED Lights so that extended use is possible even if the solar panels have not been exposed to sufficient outside light to charge.

In other configurations, it will be understood that the user can further control the operation of the light 10 with a smartphone that is configured to cooperatively communicate with the light. In that instance, both features of the smartphone direction, and onboard sensors can be used together. That is, the smartphone can provide data as to sunrise and sunset and the current time to the light, and the light can use that information along with data from the vibrometer to determine if the LED lights should be on or off.

It is further contemplated that the light assembly can be removably coupled to the roof of the vehicle (or to another outside surface to which it is attached). In such a configuration, the user can remove and replace the light as needed (i.e., move from vehicle to vehicle or from one outside surface to another).

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. An illumination apparatus to be used with a motor vehicle, comprising:
    a base having a lower surface and an upper surface opposite the lower surface, the upper surface and the lower surface cooperating to define an outer perimeter;
    a housing having an outer surface, an inner surface, and a mating surface at an outer perimeter thereof, the mating surface configured to interface with the outer perimeter of the base to define a sealed cavity, the housing having a lens portion and a charging portion, the lens portion and the charging portion each being at least one of transparent and translucent;
    at least one LED light;
    a control circuitry;
    a solar panel;
    a battery;
    a vibrometer; and
    a light sensor;
    wherein the at least one LED light, the battery, the solar panel, and the sensors are electronically interconnected with the control circuitry to direct the LED light to ON and OFF conditions, and for the solar panel to charge the battery, with the control circuitry directing the at least one LED light into the ON condition when activation of the motor vehicle is detected by the vibrometer and an ambient light level detected by the light sensor falls below a predetermined level, and directing the at least one LED light into an OFF condition when deactivation of the motor vehicle is detected by the vibrometer or the ambient light level is not below the predetermined level.

2. The illumination apparatus of claim 1 wherein the base includes an upper surface with a raised portion, with the electronic assembly mounted on the raised portion, the raised portion configured so that once the electronic assembly is mounted thereupon, the at least one LED light is positioned to be directed through the lens portion, and the solar panel is configured to be visible through the charging portion.

3. The illumination apparatus of claim 1 wherein the lower surface of the base further includes an outer planar portion extending inwardly from the outer perimeter, the outer planar portion configured to receive an adhesive pad structurally configured for attachment to the outside surface.

4. The illumination apparatus of claim 1 further comprising one of an adhesive pad and a magnet provided on the lower surface of the base, the one the adhesive pad and the magnet configured for placement of the illumination apparatus on the vehicle.

5. The illumination apparatus of claim 1 wherein the at least one LED light comprises a plurality of LED lights coupled to the control circuitry.

6. The illumination apparatus of claim 5 wherein the plurality of LED lights comprises between 2 and 5 LED lights.

7. The illumination apparatus of claim 1 wherein the LED light is directed through the lens portion of the housing, and wherein the solar panel is positioned so as to be visible through the charging portion of the housing.

8. The illumination apparatus of claim 7 wherein the charging portion faces a direction normal to the lower surface of the base and the lens portion faces a direction parallel to the lower surface of the base.

9. A method of lighting a motor vehicle, comprising the steps of:
adhering an illumination apparatus on an outer surface of a vehicle, the illumination apparatus comprising:
a base having a lower surface, an upper surface opposite the lower surface, the upper surface and the lower surface cooperating to define an outer perimeter;
a housing having an outer surface and an inner surface and a mating surface at an outer perimeter thereof, the mating surface configured to interface with the outer perimeter of the base to define a sealed cavity, the housing having a lens portion and a charging portion, the lens portion and the charging portion each being at least one of transparent and translucent; and
at least one LED light; a control circuitry;
a solar panel;
a battery;
a vibrometer; and
a light sensor;
sensing that the vehicle is ON by the vibrometer; and
sensing by the light sensor an ambient light level,
wherein the at least one LED light, the battery, the solar panel, and the sensors are electronically interconnected with the control circuitry to direct the LED light to ON and OFF conditions, and for the solar panel to charge the battery, with the control circuitry directing the at least one LED light into the ON condition when activation of the motor vehicle is detected by the vibrometer and the ambient light level detected by the light sensor falls below a predetermined level, and directing the at least one LED light into an OFF condition when deactivation of the motor vehicle is detected by the vibrometer or the ambient light level is not below the predetermined level.

10. The method of claim 9 further comprising the steps of:
receiving ambient light onto a solar panel;
generating electrical current; and
charging a battery positioned within the housing of the illumination apparatus.

* * * * *